US012506599B2

(12) United States Patent
Saravanan et al.

(10) Patent No.: US 12,506,599 B2
(45) Date of Patent: Dec. 23, 2025

(54) METHODS AND SYSTEMS FOR SECURE NETWORK COMMUNICATION (71) Applicant: Marvell Asia Pte. Ltd., Singapore (SG)

(72) Inventors: Dhanalakshmi Saravanan, Koramangala (IN); Raga Sruthi Nemalipuri, Hyderabad (IN)

(73) Assignee: Marvell Asia PTE, LTD, Singapore (SG)

( * ) Notice: Subject to any disclaimer, the term of this patent is extended or adjusted under 35 U.S.C. 154(b) by 56 days.

(21) Appl. No.: 17/323,299

(22) Filed: May 18, 2021

(65) Prior Publication Data

US 2021/0367767 A1    Nov. 25, 2021

Related U.S. Application Data (60) Provisional application No. 63/028,314, filed on May 21, 2020.

(51) Int. Cl.
*H04L 9/08* (2006.01)
*H04L 9/40* (2022.01)

(52) U.S. Cl.
CPC .......... *H04L 9/085* (2013.01); *H04L 63/0823* (2013.01)

(58) Field of Classification Search
None
See application file for complete search history.

(56) References Cited

U.S. PATENT DOCUMENTS 8,782,774 B1 * 7/2014 Pahl ...................... H04L 9/0869
726/4
9,602,282 B2    3/2017 Hussain
(Continued)

FOREIGN PATENT DOCUMENTS

CN    108650227 A  * 10/2018  ......... H04L 63/0428
CN    110048850 A  *  7/2019
(Continued)

OTHER PUBLICATIONS

Chen; "Recommendation for Key Derivation Using Pseudorandom Functions"; Computer Security NIST Special Publication 800-108; Department of Commerce; Oct. 2009; 21 Pages.
(Continued)

*Primary Examiner* — Oleg Korsak
*Assistant Examiner* — Shadi H Kobrosli (57) ABSTRACT Methods and systems for executing a communication protocol are provided. One method includes receiving, by a security module of a first computing device, an API call to authenticate a certificate received from a second computing device to establish a communication session between the computing devices; selecting, by the security module, an authentication module to authenticate the certificate; generating, by an encryption module of the security module, a shared secret key for the communication session based on a private key of the first computing device and a public key of the second computing device; encrypting, by the encryption module, the shared secret key using an algorithm negotiated between the first computing device and the second computing device; generating, by the security module, an encrypted message for the second computing device; and transmitting, by the first computing device, the encrypted shared secret key and message to the second computing device.

26 Claims, 4 Drawing Sheets

(56) References Cited

U.S. PATENT DOCUMENTS

| | | | | |
|---|---|---|---|---|
| 9,935,769 | B1* | 4/2018 | Mehr | H04L 63/0272 |
| 10,176,122 | B2* | 1/2019 | Kaplan | G06F 3/0673 |
| 11,349,659 | B2* | 5/2022 | Bhatnagar | H04L 9/3273 |
| 11,601,288 | B1* | 3/2023 | Bacon | H04L 63/205 |
| 2008/0260163 | A1* | 10/2008 | Yushiya | H04L 9/083 |
| | | | | 380/279 |
| 2011/0296440 | A1* | 12/2011 | Laurich | H04L 67/1097 |
| | | | | 719/326 |
| 2015/0303964 | A1* | 10/2015 | Shriya | H04L 63/0876 |
| | | | | 455/558 |
| 2016/0196440 | A1 | 7/2016 | O'Hare et al. | |
| 2016/0241389 | A1* | 8/2016 | Le Saint | H04L 9/0844 |
| 2017/0359185 | A1* | 12/2017 | Hang | H04L 9/0897 |
| 2019/0097793 | A1* | 3/2019 | Nix | H04L 63/0272 |
| 2019/0222560 | A1 | 7/2019 | Ford et al. | |
| 2019/0253249 | A1* | 8/2019 | Meng | G06Q 20/204 |
| 2020/0021446 | A1* | 1/2020 | Roennow | H04L 9/0819 |
| 2020/0028946 | A1* | 1/2020 | Vora | H04L 1/1874 |
| 2020/0092109 | A1 | 3/2020 | Kludy et al. | |
| 2021/0067956 | A1* | 3/2021 | Vigneswaran | H04W 12/06 |
| 2021/0144004 | A1* | 5/2021 | Gray | H04L 9/3265 |
| 2021/0266154 | A1* | 8/2021 | Sczepczenski | H04L 63/205 |
| 2021/0344511 | A1* | 11/2021 | Devarajan | H04L 63/0281 |
| 2021/0359842 | A1* | 11/2021 | Pillai | H04L 9/0825 |
| 2021/0385075 | A1* | 12/2021 | Sullivan | H04W 12/04 |
| 2021/0385201 | A1* | 12/2021 | Saint | H04L 63/0471 |
| 2023/0076669 | A1* | 3/2023 | Acharya | H04W 4/44 |
| 2023/0308293 | A1* | 9/2023 | Pergament | H04L 63/0428 |

FOREIGN PATENT DOCUMENTS

| | | | | |
|---|---|---|---|---|
| KR | 10-20190049133 | | 5/2019 | |
| WO | 2016182923 | | 11/2016 | |
| WO | WO-2018236908 | A1 * | 12/2018 | ......... H04L 63/0435 |
| WO | WO-2021094863 | A1 * | 5/2021 | ......... H04L 63/0428 |

OTHER PUBLICATIONS

International Search Report on corresponding PCT application (PCT/IB2021/054287) from International Searching Authority (KR) dated Aug. 23, 2021.

Written Opinion on corresponding PCT application (PCT/IB2021/054287) from International Searching Authority (KR) dated Aug. 23, 2021.

* cited by examiner

METHODS AND SYSTEMS FOR SECURE NETWORK COMMUNICATION

CROSS-REFERENCE TO RELATED APPLICATION(S)

This patent application claims priority under 35 USC § 119 (e) to the U.S. Provisional Patent Application, Ser. No. 63/028,314, entitled "Accelerated TLS Handshake Processing With Elliptic Curve Crypto Key Exchange," filed on May 21, 2020, the disclosure of which is incorporated herein in its entirety.

TECHNICAL FIELD

The present invention relates to secured network communication between computing devices.

BACKGROUND

Electronic data transmission via network connections (e.g. Internet and others) continues to grow. It is desirable to efficiently establish a secured communication session and protect messages transmitted during communication sessions.

Conventional systems today use various handshake protocols to establish a communication session to exchange information and then exchange information using encryption. Conventional systems are inefficient because they often use multiple (i.e. more than 2) application programming interface (API) calls to specialized hardware for authentication and encryption key generation to establish a communication session and to encrypt messages that are transmitted during the communication session. It is desirable to reduce the number of API calls for establishing and using secure communication sessions to improve the overall efficiency of the handshake and encryption processes. Continuous efforts are being made to develop technology that can efficiently establish communication sessions and encrypt information without having to make multiple API calls to specialized hardware.

BRIEF DESCRIPTION OF THE DRAWINGS

The various aspects relating to securing data will now be discussed in detail with an emphasis on highlighting the advantageous features. These novel and non-obvious aspects are shown in the accompanying drawings, which are for illustrative purposes only. The illustrated aspects are intended to illustrate, but not to limit the present disclosure. In the drawings, the same components have the same reference numbers. These drawings include the following figures, in which like numerals indicate like parts.

DETAILED DESCRIPTION

The following detailed description describes the various aspects of the present disclosure with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices. The program code can be stored in one or more non-transitory computer readable memory devices (including a memory of a hardware processing device) and may be based on the various process flows described below in detail.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The various aspects disclosed herein, may be implemented as a computer process (method), a computing system, or as an article of manufacture, such as a computer program product or computer-readable media. The computer program product may be non-transitory computer storage media, readable by a computing device, and encoding a computer program of instructions for executing a computer process.

Encryption/Decryption Overview: Before providing details of the adaptive aspects of the present disclosure, a brief overview of encryption/decryption will be helpful. Encryption involves taking decipherable information and making it seem arbitrary. Encryption typically uses an encryption key that involve a set of mathematical rules and values that a sender and receiver of information know.

Encryption can be symmetric or asymmetric. Symmetric encryption uses a single secret key, while asymmetric encryption involves using multiple keys to encrypt/decrypt information. In symmetric encryption, data is encrypted and decrypted with a secret key known to both a sender and a recipient. Symmetric encryption is computationally efficient, but having a common secret key means it needs to be shared in a secure manner. Asymmetric encryption uses a public key and a private key. The public key is made available to others, while the private key is held private. The public key is mathematically related to the private key, but given enough key length, itis computationally impractical to derive the private key from the public key. This allows a public key of a recipient to be used by a sender to encrypt data, but that data can only be decrypted with the private key of the recipient. Encryption/decryption use various protocols and algorithms. Some of these protocols and algorithms are mentioned below as examples, without limiting the various adaptive aspects of the present disclosure.

Transport Layer Security (TLS) is an industry standard protocol that is used to securely deliver data sent and received over the Internet. TLS is particularly useful in secure transmission of private and sensitive information such as passwords, credit card numbers, and personal data. TLS uses authentication algorithms to authenticate an identity of a sending device and integrity algorithms to ensure data received is the data that was sent by the sending device. TLS is typically executed above the transmission control protocol ("TCP") in a network protocol stack. TLS can be used by various application layer protocols, including HTTP (Hyper Text Transfer Protocol), File Transfer Protocol ("FTP") and others. Open SSL (Secure Socket Layer) is a cryptography library that can be used to implement the TLS protocol. Typically, a processor executable, Open SSL application using the Open SSL library implements the TLS protocol.

The TLS protocol includes a handshake protocol and a record protocol. The handshake protocol establishes a secure session (i.e. handshake) between a client computing system (may also be referred to as a first computing system or as a client) and a server system (may also be referred to as a second computing system or as a server). The record protocol is used to secure data, using secret keys generated during the handshake protocol.

A typical TLS handshake begins with a "Client-Hello" message sent by the client to the server. The Client-Hello message includes a list of cipher-suites that the client system supports. The cipher suite is defined by its name and identifies the algorithms that are supported by the client for the TLS handshake and record protocols. For example, a cipher suite may include: "ECDHE-RSA-AES128-GCM-SHA256-P256." The following provides a brief introduction of these various abbreviations.

"ECDHE" means "Elliptic Curve Diffie-Hellman Ephemeral," a key exchange, anonymous key agreement protocol that allows two computing devices, each having an Elliptic Curve public-private key pair, to establish a shared secret key ($x_K$) over an insecure channel. The shared secret is then used to derive another symmetric key to encrypt subsequent communications. The term Ephemeral is this context means that the key is regenerated after each session, providing Perfect Forward Secrecy (PFS).

"RSA" stands for "Rivest-Shamir-Adleman," and defines an encryption algorithm that can be used to prove an identity of a client and a server. RSA can be used as a signing algorithm in conjunction with ECDHE during a key exchange of the TLS handshake protocol.

AES128-GCM stands for "Advanced Encryption Standard (AES)-Galois/Counter Mode." AES is a symmetric encryption algorithm with a key length of 128 bits as a block cipher. GCM defines a mode of operation of a symmetric key block cipher. AES keys for communication will be derived from the ECDHE-RSA handshake during the TLS handshake protocol execution. TLS handshake protocol uses a key derivation function ("KDF") to generate a session key, as described below in detail. KDF is a function that, with the input of a cryptographic key and other data, generates a binary string, called keying material. AES128-GCM is also used to encrypt a finished message that is transmitted by a sending device.

"SHA256" means a 256-bit "Secure Hash Algorithm (SHA)." SHA256 is used as a Pseudo-Random-Function ("PRF") to generate the finished message of handshake process.

"P256" indicates an elliptic curve that enables NIST (National Institute of Standards and Technology) P-256 signatures and key agreement. This is used to generate a shared secret using the Elliptical Curve Cryptography ("ECC") point curve multiplication.

Figure 1A:
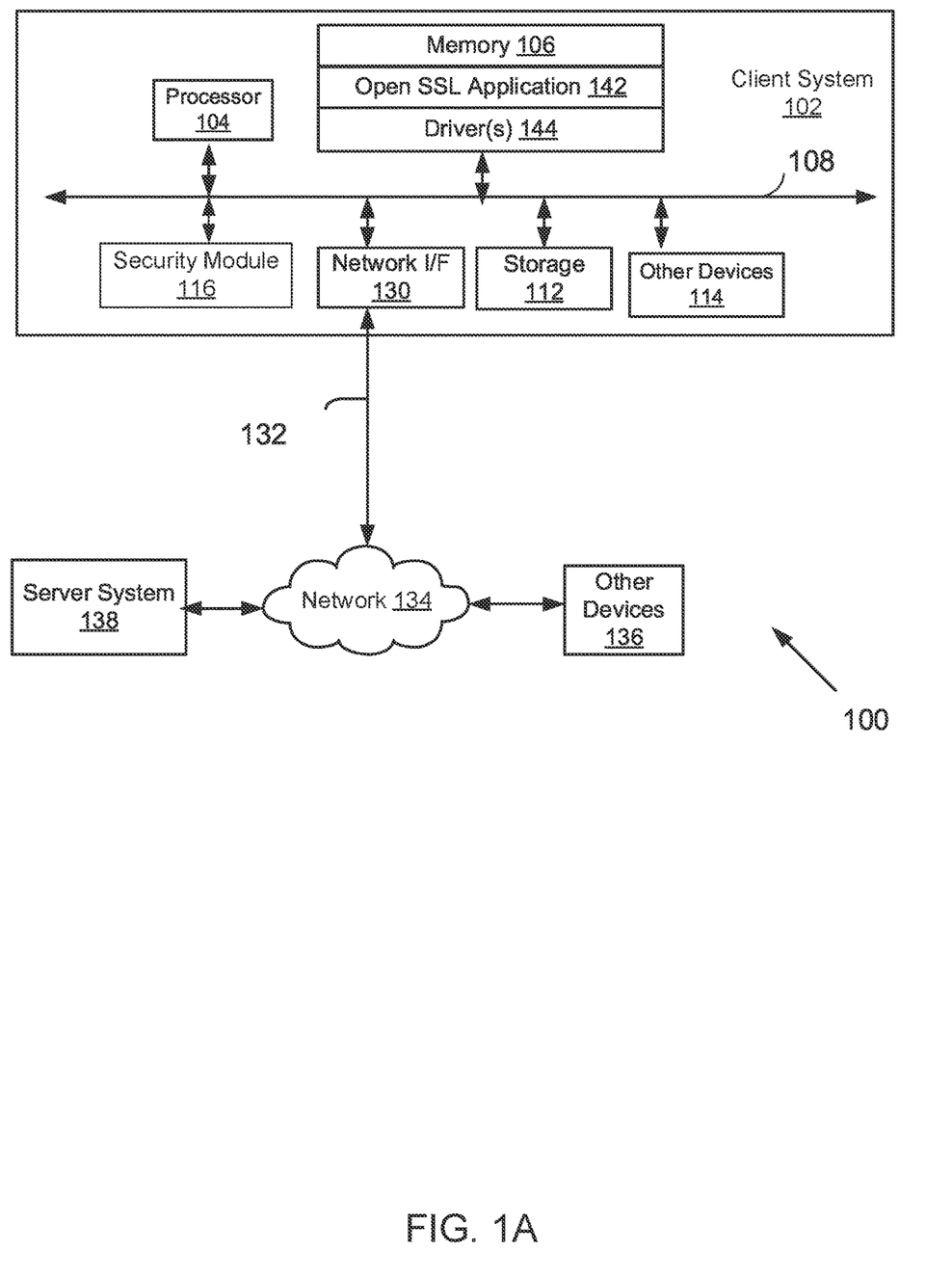
FIG. 1A is a functional block diagram of a system with a security module at a client computing system, according to one aspect of the present disclosure.
Figure 1B:
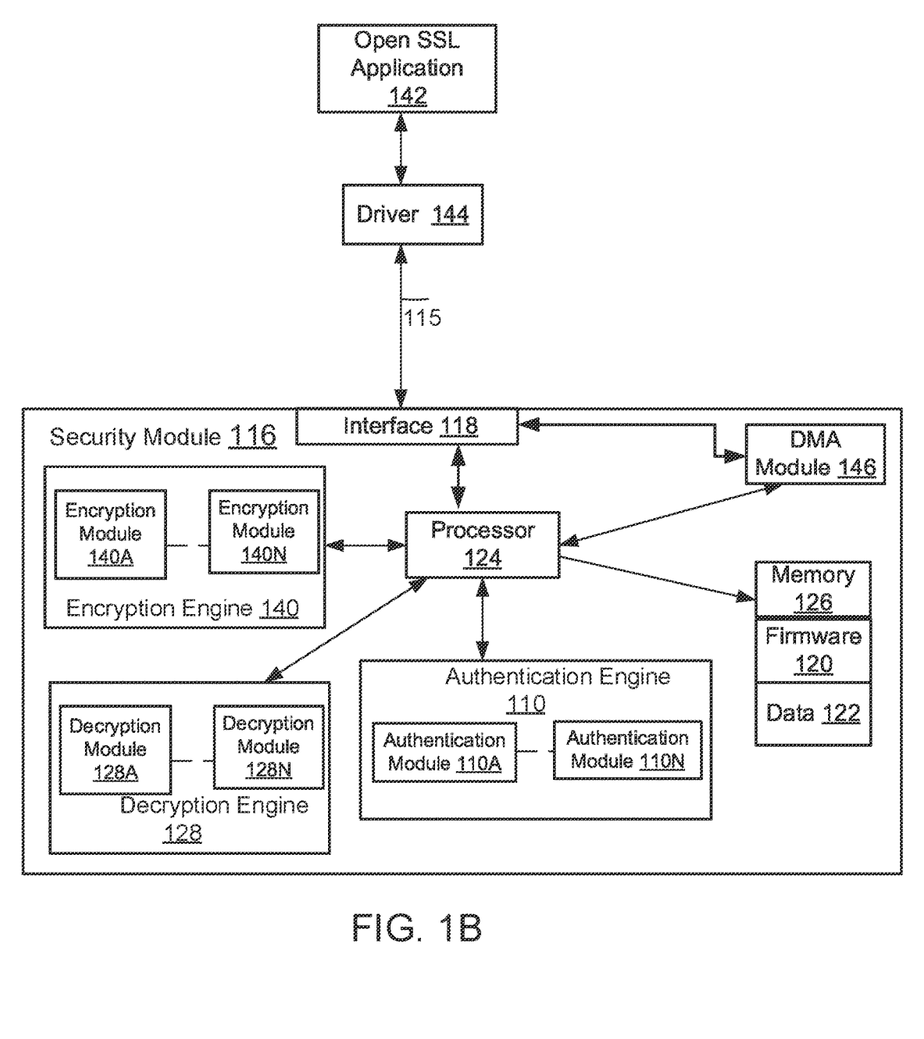
FIG. 1B shows a high-level block diagram of a security module, according to one aspect of the present disclosure.

In conventional stems, numerous application programming interface (API) calls are made to hardware devices to execute both the TLS handshake and record protocols. This slows the overall handshake and encryption processes for establishing secure communication sessions and generating secure messages for the communication sessions. The innovative technology disclosed herein des a security module 116, see FIGS. 1A/1B) that can also be referred to as a hardware crypto accelerator. The security module interfaces with an Open SSL application and executes various authentication and key generation operations using just one or two API calls, as described below in detail. This improves execution of the TLS handshake and record protocols. It is noteworthy that, although the description below is based on TLS, as an example, the adaptive aspects of the present disclosure are not limited to the TLS protocols, and can be used for any secure handshake and encryption protocol.

System 100: FIG. 1A shows an example of a system 100 configured for use with the various aspects of the present disclosure. System 100 may include one or more computing systems 102 and 138 (shown as client system 102 (may also be referred to as "client 102") and server system 138 (may also be referred to as "server 138")) having a security module 116 accessible by an interconnect system, for example, a PCI-Express (PCIe) link or any other interconnect type. The client 102 connects with a network 134 via a network interface 130 using one or more network links 132 to communicate with the server 138 and other devices 136. The network interface 130 includes logic and circuitry to send and receive information via the network link 132 based on a network protocol, e.g. Ethernet, Gigabit Ethernet, Fibre Channel over Ethernet or any other networking protocol. The adaptive aspects of the present disclosure are not limited to any specific protocol.

In one aspect, the security module 116 is used to encrypt data before data is transmitted to another device, for example, the server 138, and decrypt encrypted data that is received from the server 138, described below in detail. The various components of server 138 are similar to the client 102 and for brevity sake, they are not described in detail. The various adaptive aspects of the present disclosure are described with respect to the client 102 that are equally applicable to the server 138.

As an example, client 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The processor 104 executes computer-executable process steps and interfaces with an interconnect (or bus) 108. The interconnect 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

Client 102 may also include other devices and interface 114, which may include a display device interface, a keyboard interface, a pointing device interface, etc. Details regarding the other devices 114 are not germane to the various aspects of the present disclosure.

Client 102 may further include a storage device 112, which includes writable storage device media such as solid state drives, storage class memory, magnetic disks, video tape, optical, DVD, magnetic tape, non-volatile memory devices, for example, self-encrypting drives, or any other storage media adapted to store structured or non-structured data. Storage device 112 may store operating system programs and data structures, application program data, and other data. Some of these files are stored on storage 112 using an installation program. For example, the processor 104 may execute computer-executable process steps of an installation program so that the processor 104 can properly execute the application program.

Memory 106 (may be referred to as client system memory 106) also interfaces with the interconnect 108 to provide the processor 104 with access to memory storage. Memory 106 may include random access main memory (RAM) or any other memory type. When executing stored computer-executable process steps from storage 112, processor 104 may store and execute the process steps out of RAM. Read only memory (ROM, not shown) may also be used to store invariant instruction sequences, such as start-up instruction sequences or basic input/output system (BIOS) sequences. Memory 106 may store an Open SSL application 142 and driver(s) 144. The drivers 144 include a driver for the security module 116, a driver for the network interface 130 or any other drivers. For convenience, driver(s) 144 is referred to as driver 144 for the security module 116. Details of using the Open SSL application 142 and driver 144 are provided below. Memory 106 may also store other applications that generate data for transmission to the server 138. One or more of these applications use the Open SSL application 142 and the security module 116 to establish a secure communication session, as described below in detail.

Processor 104 of the client 102 also executes an operating system (not shown) out of memory 106 for controlling the overall operations of the client 102. The operating system may be Windows based, Linux operating system, Solaris, or any other operating system type (without derogation of any third-party trademark rights). The various aspects of the present disclosure are not limited to any particular operating system type.

Security Module 116: FIG. 1B shows a block diagram of the security module 116 that communicates with the Open SSL Application 142 via an interface 118 and link 115. In one aspect, interface 118 may be a PCI Express interface having logic/circuitry for sending and receiving PCI-Express packets. The security module 116 may also include a processor 124 (e.g. a RISC (Reduced Instruction Set Computer) or any other processor type) that executes firmware 120 out of a memory 126 to control the overall TLS handshake and record protocol operations. The memory 126 may also store data 122, which may include various encryption keys used to execute the TLS handshake and record protocol related operations, as described below in detail. The security module 116 may also include local storage (not shown), which may be for example non-volatile memory, such as flash memory, or any other device. The local storage may store executable instructions and operating parameters (e.g. encryption keys) that can be used for controlling the security module 122 operations.

The security module 116 may also include a direct memory access (DMA) module 146 that is used to manage access to link 115. The DMA module 146 uses a plurality of DMA channels (not shown) for managing access to link 115.

The DMA channels are typically used to move information between client system memory 106 and the security module memory 126. It is noteworthy that the DMA module 146 may have a transmit side DMA segment to bring information from client system memory 106 and a receive side DMA segment to send information to the client system memory 106

In one aspect, the security module 116 includes an encryption engine 140 with various encryption modules 140A-140N. Each encryption module includes hardware configured to encrypt outgoing information using a specific algorithm, for example, AES, AES-GCM, DES (Data Encryption Standard), Chacha_poly, ECDHE, RSA and others. By using dedicated hardware components to execute the various encryption algorithms improves the over computation performance for executing the TLS protocol. It is noteworthy that the adaptive aspects are not limited to any specific standard or proprietary encryption/decryption standards.

The security module 116 also includes a decryption engine 128 with various hardware-based decryption modules 128A-128N. The decryption modules 128A-128N are used to decrypt information using a decryption key. The decryption key may be stored in memory 126 within data 122.

The security module 116 also includes an authentication engine 128 with various hardware-based authentication modules 110A-110N. The authentication modules execute an algorithm to authenticate certificates using an asymmetric crypto operation, for example, the RSA algorithm. The authentication modules 110A-110N also execute algorithms like MDS (Message Digest), and secure hash algorithms, e.g., SHA1, SHA2, and SHA3 to verify the integrity of a message.

In one aspect, after the Open SSL application 142 (may also be referred to as application 142) of client 102 executes an initial key exchange with the server 138, the application 142 makes an API call to the security module 116 to perform authentication, generate a shared secret key, generate a session key and encrypt a finished message, as described below in detail. It is noteworthy that the security module 116 at the server 116 is also configured to perform the same functions.

Figure 2A:
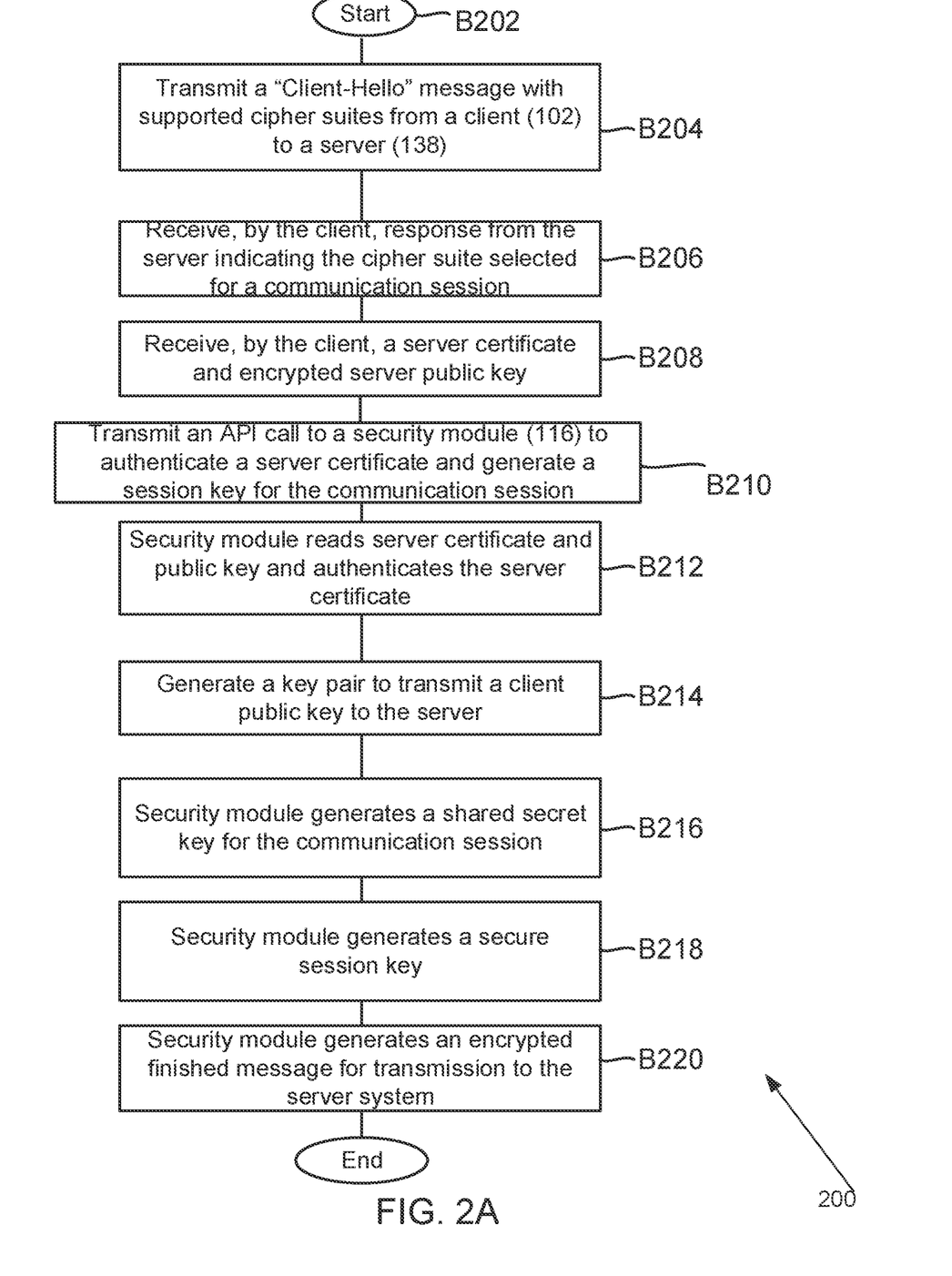
FIG. 2A shows a process for establishing a secure communication session and encryption of information during the secure communication session, according to one aspect of the present disclosure.

Process Flows: FIG. 2A shows a process 200 for efficiently establishing a secure communication session for transmitting and receiving encrypted data, according to one aspect of the present disclosure. Process 200, as an example, illustrates an efficient execution of the TLS handshake and record protocols. Process 200 is described with respect to the client 102 initiating a communication session with the server 138 (FIG. 1A), however, the various process blocks are equally applicable if the server 138 initiates the communication session with the client 102.

Process 200 begins in block B202, when the client 102 and the server 138 are initialized and operational. An application executed at the client 102 may want to send some data to the server 138. To initiate the data transmission, the application requests the Open SSL Application 142 to establish a secure communication session. The Open SSL Application 142 begins the TLS handshake process using network interface 130.

In block B204, the Open SSL application 142 transmits an introductory message (e.g. a "Client-Hello" message specified by the TLS handshake protocol) to the server 138 requesting a communication session. The introductory message also includes a list of cipher algorithms (i.e. a cipher suite) that is supported by the client 102 during the communication session e.g., the ECDHE-RSA-AES128-GCM-SHA256-P256 suite, described above. The introductory message is sent to server 138 via the network interface 130 using the network link 132.

In block B206, the client 102 receives a response from the server 138 via the network interface 130. The server 138 response includes a "Server-Hello" message. The server 138 response indicates the cipher suite that the server 138 can support for the communication session. The cipher suite is then used for the communication session between the client 102 and the server 138.

In block B208, the client 102 receives a server 138 certificate e.g., $Q_{cert}$. The server 138 first generates a key pair, $(d_S, Q_S)$, and encrypts the server 138 public key with a private-key of the certificate, e.g., $(d_{cert}(Q_S))$. The encrypted public key is transmitted to the client 102 by a network interface (not shown, similar to network interface 130 of client 102) of the server 138. The client 102 receives the information at the network interface 130. The certificates may initially be stored at memory 106 and provided to the security module 116, by the Open SSL Application 142, e.g., by using a DMA operation. In another aspect, the network interface 130 may provide the certificates directly to the security module 116 and store it at memory 106.

In block B210, the Open SSL application 142 makes an API call to the security module 116 to authenticate the server 138 certificate and generate a session key for the communication session. The Open SSL Application 142 sends the API call via driver 144. In one aspect, the API call includes the server 138 provided $Q_{cert}$ and $Q_S$ to the security module 116. The API call can be made via a DMA operation. In one aspect, the Open SSL application 142 stores the $Q_{cert}$ and $Q_S$ at memory 126 (shown as data 122) and provides a pointer to the processor 124, indicating where the server 138 certificate and public key are stored.

In block B212, the processor 124 selects an authentication module of the authentication engine 110 (FIG. 1B). The authentication module is selected based on the signature type that is used to sign the server 138 certificate. The processor 124 may maintain a mapping that maps each authentication module with a signature type in memory 126, for example, in data 122. The selected authentication module is provided the storage location (e.g., by a pointer (not shown) of $Q_{cert}$ and $Q_S$. The authentication module reads the $Q_{cert}$ and $Q_S$ from memory 126 and authenticates the certificate. As an example, the authentication module verifies an RSA signature $(Q_{cert}(d_{cert}(Q_S)))$ that is received from the server 138.

In block B214, a key pair $(d_C, Q_C)$ with a client 102 public key is generated. The client public key is then sent to the server 138 via the network interface 130. The client public key can be generated by the Open SSL Application 142 or by the security module 116 and transmitted by the network interface 130. This enables the server 138 to decrypt messages that are sent by the client 102.

In block B216, an encryption module of the encryption engine 140 of the security module 116 is selected by processor 124. The encryption module is selected based on the algorithm that will be used to generate a shared key and the algorithm used to encrypt the shared key. The processor 124 may maintain a mapping that maps each encryption module with an algorithm type in memory 126, for example, in data 122. The selected encryption module generates a shared secret key for the communication session. As an example, the encryption module executes an ECC point multiplication of its own private key and the server 138's public key i.e. $(d_C \cdot Q_S)$, to determine coordinates of an Elliptic Curve Point defined as: $(x_K, y_K)$. The x-coordinate of the Elliptic Curve Point $(x_K)$, which can 256 bits in length, is then used as the shared-secret key for the communication session between the server 138 and the client 102.

In block B218, the encryption module also generates a secure session key, for the communication session. For example, the x-coordinate of the Elliptic Curve Point can be used to generate the secured session key for AES128-GCM encryption, by using a Key Derivation Function (KDF) or Pseudo Random Function (PRF) with the SHA256 Hash algorithm.

Thereafter, in block B220, the encryption module of the security module 116 at the client 102 generates an encrypted finished message for the server 138. The encrypted message can be encrypted using AES128-GCM or any other encryption algorithm. The encrypted message is transmitted by the network interface 130 to the server 138. The server 138 decrypts the encrypted message using the session key that is generated by server 138 in similar process like client 102.

In one aspect, although the foregoing process illustrates the various process blocks from the client 102's perspective, the server 138 can also generate a shared secret by performing EC Point Multiplication with the client 102's private and public key: $(d_S \cdot Q_C)$. The x-coordinate of the resultant Elliptic Curve, $x_K$ becomes the shared secret that is used by the client 102 to decrypt any messages that are received from the server 138.

Figure 2B:
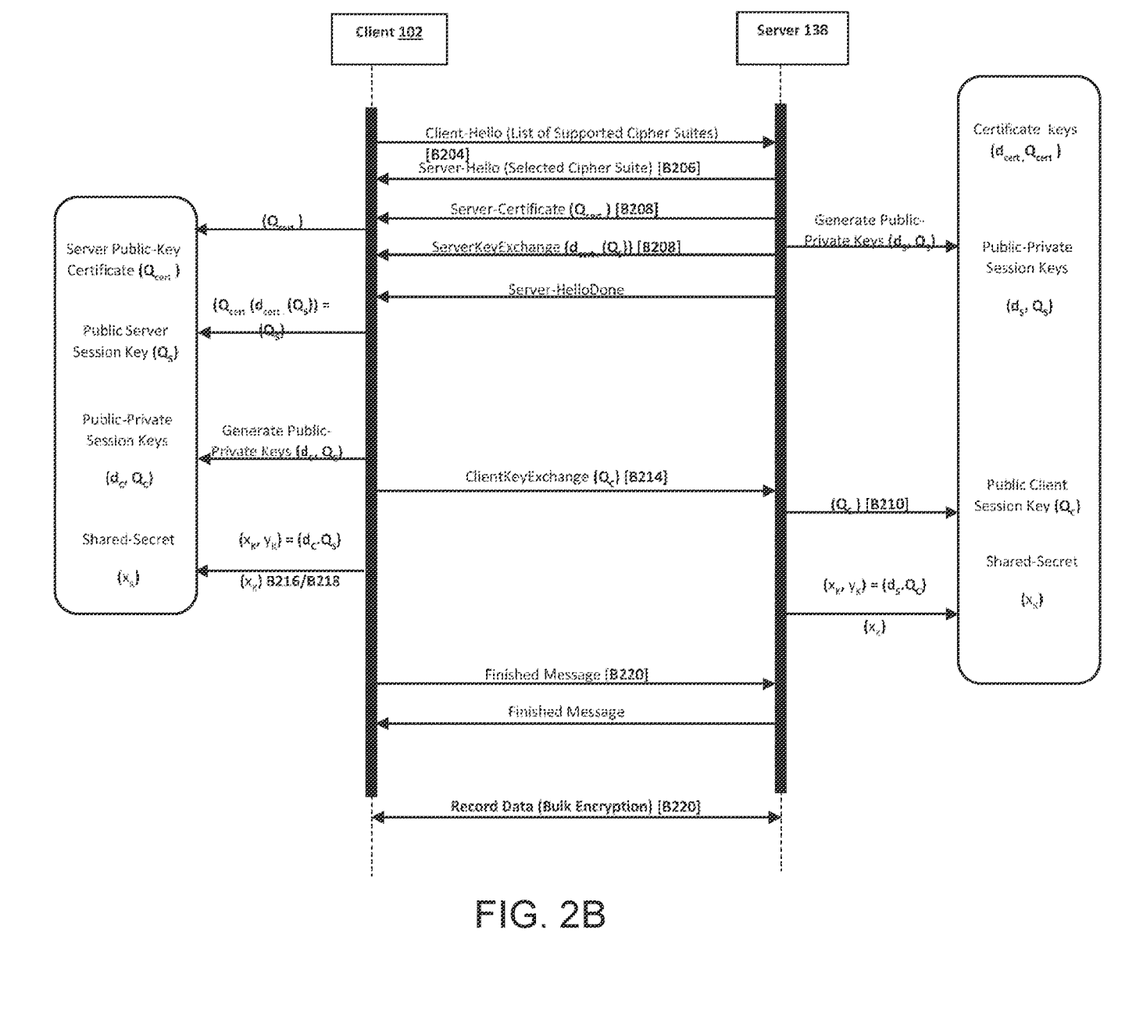
FIG. 2B shows an example of the process flow of FIG. 2A, according to one aspect of the present disclosure.

FIG. 2B shows an example of process 200, according to one aspect of the present disclosure. For example, as shown in FIG. 2B, the client 102 sends a "Client-Hello" message with a cipher suite that provides a list of supported algorithms, e.g., ECDHE-RSA-AES128-GCM-SHA256-P256, described above in detail [Block B204, FIG. 2A]. The adaptive aspects of the present disclosure are not limited to the specific cipher algorithms. The client 102 receives a "Server-Hello" message from the server 138 indicating the selected algorithms from the Client-Hello messages. This establishes the cipher suite for the TLS communication session. [B206, FIG. 2A]

The client 102 receives a server certificate $(Q_{cert})$ from the server 138. The client 102 also receives a server 138 generated key pair $(d_S, Q_S)$ for the ECDHE algorithm. [B208, FIG. 2A] The server public key is encrypted with a private-key of the server certificate $(d_{cert}(Q_S))$. Client 102 uses the public key received in the Certificate message to verify the RSA signature $(Q_{cert}(d_{cert}(Q_S)))$, to obtain an ECDH(E) public key $(Q_S)$ of the server 138. [B210, FIG. 2A]

The client 102 also generates its own ECDHE key-pair $(d_C, Q_C)$, and sends it to the server 138. [B214] The security module 116 at the client 102 computes a shared secret key by performing an EC Point Multiplication with one's own private key and the server 138's public key. For instance, the security module 116 at the client 116 executes the ECC Point Multiplication of its own private key and the server 138's public key $(d_C \cdot Q_S)$, to determine coordinates of an Elliptic Curve Point $(x_K, y_K)$. The x-coordinate of this Elliptic Curve Point $(x_K)$, becomes the shared secret key, [B216, FIG. 2A]. This value is used to generate a secured session key needed for an AES128-GCM cipher, by using KDF or PRF with the SHA256 hash algorithm. [B218, FIG. 2A] The client 102 then sends a finished encrypted message, e.g., using the AES128-GCM algorithm. [B220, FIG. 2A]. The security module 116 at the server 138 performs similar functions as the security module 116 of the client 102, decrypts the finished message using the session key that is created by the server 138 and verifies the decrypted message.

The technology disclosed herein executes the TLS handshake and record protocols in one or two API calls. This improves the overall efficiency with which a secure communication session is established, and message encryption is accomplished. Unlike conventional systems, multiple API calls (i.e. greater than 1 or 2 calls) are not needed. This improves usage of computing and processing resources of client 102 and server 1238.

In one aspect, technology for a novel method is provided. The method includes: receiving, by a security module (e.g., 116, FIG. 1B) of a first computing device (e.g. client 102, FIG. 1A), an application programming interface (API) call to authenticate a certificate received from a second computing device (e.g., server 138) to establish a secured communication session between the first computing device and the second computing device (Block 210, FIG. 2A); selecting, by the security module, an authentication module to authenticate the certificate (B212, FIG. 2A); generating, by an encryption module of the security module, a shared secret key for the communication session based on a private key of the first computing device and a public key of the second computing device (B216, FIG. 2A); encrypting, by the encryption module, the shared secret key using an algorithm negotiated between the first computing device and the second computing device (B218, FIG. 2A); generating, by the security module, an encrypted message for the second computing device (B220, FIG. 2A); and transmitting, by the first computing device, the encrypted shared secret key and the encrypted message to the second computing device (B220, FIG. 2A).

In another aspect, a novel security module is provided. The security module includes a processor executing instructions out of a memory and interfacing with an encryption engine (e.g., 140, FIG. 1B) having a plurality of encryption modules (e.g., 140A-140N, FIG. 1B) and an authentication engine (e.g., 110, FIG. 1B) having a plurality of authentication modules (e.g., 110A-110N), the security module configured to: receive an application programming interface (API) call to authenticate a certificate received from a second computing device to establish a secured communication session between the first computing device and the second computing device; select an authentication module to authenticate the certificate by verifying a certificate signature of the certificate; generate, by an encryption module, a shared secret key for the communication session based on a private key of the first computing device and a public key of the second computing device; encrypt, by the encryption module, the shared secret key using an algorithm negotiated between the first computing device and the second computing device; and generate, by the encryption module, an encrypted message for the second computing device. The first computing device transmits the encrypted shared secret key and the encrypted message to the second computing device.

In yet another aspect, a non-transitory, machine readable storage medium having stored thereon instructions for performing a method, with machine executable code which when executed by one or more machine, causes the one or more machine to: receive, by a security module of a first computing device, an application programming interface (API) call to authenticate a certificate received from a second computing device to establish a secured communication session between the first computing device and the second computing device; select, by the security module, an authentication module to authenticate the certificate; generate, by an encryption module of the security module, a shared secret key for the communication session based on a private key of the first computing device and a public key of the second computing device; encrypt, by the encryption module, the shared secret key using an algorithm negotiated between the first computing device and the second computing device; generate, by the security module, an encrypted message for the second computing device; and transmit, by the first computing device, the encrypted shared secret key and the encrypted message to the second computing device.

The above description presents the best mode contemplated for carrying out the present aspects, and of the manner and process of making and using them, in such full, clear, concise, and exact terms as to enable any person skilled in the art to which they pertain to make and use these aspects. These aspects are, however, susceptible to modifications and alternate constructions from that discussed above that are fully equivalent. For example, the aspects disclosed herein are applicable to any peripheral device and are not limited to any encryption algorithm type. Consequently, these aspects are not limited to the particular aspects disclosed. On the contrary, these aspects cover all modifications and alternate constructions coming within the spirit and scope of the aspects as generally expressed by the following claims, which particularly point out and distinctly claim the subject matter of the aspects.

What is claimed is:

1. A method, comprising:
    receiving, by a security module of a first computing device, a call to authenticate a certificate received from a second computing device to establish a secured communication session between the first computing device and the second computing device, wherein the security module includes a direct memory access module;
    managing, with the direct memory access module, the transfer of data between a system memory of the first computing device and a security module memory of the security module, wherein the call is received via the direct memory access module;
    selecting, by the security module, an authentication module to authenticate the certificate;
    generating, by an encryption module of a plurality of encryption modules of an encryption engine of the security module, a shared secret key for the communication session based on a private key of the first computing device and a public key of the second computing device, wherein the generating of the shared secret key comprises using the private key of the first computing device and the public key of the second computing device to generate the shared secret key;
    encrypting, by the encryption module, the shared secret key using an algorithm negotiated between the first computing device and the second computing device;
    generating, by the security module, an encrypted message for the second computing device; and
    transmitting, by the first computing device, the encrypted shared secret key and the encrypted message to the second computing device.

2. The method of claim 1, further comprising: generating, by a processor executable application of the first computing device, the call for the security module.

3. The method of claim 2, further comprising:
    providing, by the processor executable application, a list of encryption algorithms to the second computing device that the security module can execute during the communication session; and receiving, by the processor executable application, a list of encryption algorithms that are supported by the second computing device for the communication session.

4. The method of claim 1, further comprising: transmitting, by the first computing device, a certificate to the second computing device for authenticating the first computing device by a security module of the second computing device for establishing the communication session.

5. The method of claim 1, further comprising: transmitting, by the first computing device, an encrypted public key of the first computing device to the second computing device upon establishing the communication session.

6. The method of claim 5, wherein the second computing device extracts the public key from the encrypted public key and uses the public key to encrypt a message for the first computing device during the communication session.

7. The method of claim 1, wherein the communication session is based on a Transport Layer Security (TLS) protocol.

8. The method of claim 1, wherein the call comprises an application programming interface (API) call.

9. The method of claim 1, wherein each of the plurality of encryption modules are associated with a different encryption algorithm and include dedicated hardware components configured to execute the different encryption algorithm, and further wherein the encryption module encrypts the shared secret key with the dedicated hardware components of the encryption module using the algorithm negotiated between the first computing device and the second computing device.

10. A non-transitory machine-readable storage medium having stored thereon instructions for performing a method, comprising machine executable code which when executed by one or more machine, causes the one or more machine to:
receive, by a security module of a first computing device, a call to authenticate a certificate received from a second computing device to establish a secured communication session between the first computing device and the second computing device, wherein the security module includes a direct memory access module;
manage, with the direct memory access module, the transfer of data between a system memory of the first computing device and a security module memory of the security module, wherein the call is received via the direct memory access module;
select, by the security module, an authentication module to authenticate the certificate;
generate, by an encryption module of a plurality of encryption modules of an encryption engine of the security module, a shared secret key for the communication session based on a private key of the first computing device and a public key of the second computing device, wherein the generating of the shared secret key comprises using the private key of the first computing device and the public key of the second computing device to generate the shared secret key;
encrypt, by the encryption module, the shared secret key using an algorithm negotiated between the first computing device and the second computing device;
generate, by the security module, an encrypted message for the second computing device; and
transmit, by the first computing device, the encrypted shared secret key and the encrypted message to the second computing device.

11. The non-transitory machine-readable storage medium of claim 10, wherein a processor executable application of the first computing device generates the call for the security module.

12. The non-transitory machine-readable storage medium of claim 11, wherein the machine executable code further causes the one or more machine to:
provide, by the processor executable application, a list of encryption algorithms to the second computing device that the security module can execute during the communication session; and
receive, by the processor executable application, a list of encryption algorithms that are supported by the second computing device for the communication session.

13. The non-transitory machine-readable storage medium of claim 10, wherein the machine executable code further causes the one or more machine to: transmit, by the first computing device, a certificate to the second computing device for authenticating the first computing device by a security module of the second computing device to establish the communication session.

14. The non-transitory machine-readable storage medium of claim 10, wherein the machine executable code further causes the one or more machine to: transmit, by the first computing device, an encrypted public key of the first computing device to the second computing device, upon establishing the communication session.

15. The non-transitory machine-readable storage medium of claim 14, wherein the second computing device extracts the public key from the encrypted public key and uses the public key to encrypt a message for the first computing device during the communication session.

16. The non-transitory machine-readable storage medium of claim 10, wherein the communication session is based on a Transport Layer Security (TLS) protocol.

17. The non-transitory machine-readable storage medium of claim 10, wherein the call comprises an application programming interface (API) call.

18. The non-transitory machine-readable storage medium of claim 10, wherein each of the plurality of encryption modules are associated with a different encryption algorithm and include dedicated hardware components configured to execute the different encryption algorithm, and further wherein the encryption module encrypts the shared secret key with the dedicated hardware components of the encryption module using the algorithm negotiated between the first computing device and the second computing device.

19. A security module of a first computing device, comprising:
a processor executing instructions out of a memory and interfacing with an encryption engine having a plurality of encryption modules and an authentication engine having a plurality of authentication modules, the security module configured to:
receive a call to authenticate a certificate received from a second computing device to establish a secured communication session between the first computing device and the second computing device, wherein the security module includes a direct memory access module;
manage, with the direct memory access module, the transfer of data between a system memory of the first computing device and a security module memory of the security module, wherein the call is received via the direct memory access module;

select an authentication module to authenticate the certificate by verifying a certificate signature of the certificate;

generate, by an encryption module of a plurality of encryption modules, a shared secret key for the communication session based on a private key of the first computing device and a public key of the second computing device, wherein the generating of the shared secret key comprises using the private key of the first computing device and the public key of the second computing device to generate the shared secret key;

encrypt, by the encryption module, the shared secret key using an algorithm negotiated between the first computing device and the second computing device; and generate, by the encryption module, an encrypted message for the second computing device;

wherein the first computing device transmits the encrypted shared secret key and the encrypted message to the second computing device.

20. The security module of claim 19, wherein a processor executable application of the first computing device generates the call for the security module.

21. The security module of claim 20, wherein the processor executable application provides a list of encryption algorithms to the second computing device that the security module can execute during the communication session; and receives a list of encryption algorithms that are supported by the second computing device for the communication session.

22. The security module of claim 19, wherein the first computing device transmits a certificate to the second computing device for authenticating the first computing device by a security module of the second computing device to establish the communication session.

23. The security module of claim 19, wherein the first computing device transmits an encrypted public key of the first computing device to the second computing device, upon establishing the communication session.

24. The security module of claim 19, wherein the communication session is based on a Transport Layer Security (TLS) protocol.

25. The security module of claim 19, wherein the call comprises an application programming interface (API) call.

26. The security module of claim 19, further comprising a set of dedicated hardware components for each of the plurality of encryption modules configured to execute an encryption algorithm associated with the encryption module, wherein the encryption module encrypts the shared secret key with the set of dedicated hardware components of the encryption module using the algorithm negotiated between the first computing device and the second computing device.

* * * * *